US008979985B2

(12) United States Patent
Ding et al.

(10) Patent No.: US 8,979,985 B2
(45) Date of Patent: Mar. 17, 2015

(54) CONFORMAL SPLIT PLANAR FLOW AIR PURIFYING FILTER

(71) Applicant: Scott Technologies, Inc., Boca Raton, FL (US)

(72) Inventors: Frank Ding, Charlotte, NC (US); Edward Powers Simmonds, Indian Trail, NC (US); Michael Lee Parham, Weddington, NC (US)

(73) Assignee: Scott Technologies, Inc., Boca Raton, FL (US)

( * ) Notice: Subject to any disclaimer, the term of this patent is extended or adjusted under 35 U.S.C. 154(b) by 0 days.

(21) Appl. No.: 13/945,040

(22) Filed: Jul. 18, 2013

(65) Prior Publication Data
US 2013/0298774 A1 Nov. 14, 2013

Related U.S. Application Data

(63) Continuation of application No. PCT/US2012/021937, filed on Jan. 20, 2012.

(60) Provisional application No. 61/434,749, filed on Jan. 20, 2011.

(51) Int. Cl.
B01D 53/02 (2006.01)
B01D 53/04 (2006.01)

(52) U.S. Cl.
CPC ........ B01D 53/0407 (2013.01); B01D 53/0415 (2013.01); B01D 2253/102 (2013.01); B01D 2258/06 (2013.01); B01D 2259/4541 (2013.01)
USPC ................ 96/134; 96/108; 96/117.5; 96/121; 96/129

(58) Field of Classification Search
USPC ........................ 96/108, 117.5, 121, 129, 134
See application file for complete search history.

(56) References Cited

U.S. PATENT DOCUMENTS

| 4,326,514 A | 4/1982 | Elan |
| 5,062,421 A | 11/1991 | Burns et al. |
| 5,147,429 A | 9/1992 | Bartholomew et al. |
| RE39,361 E | 10/2006 | Den Dekker |
| 7,442,237 B1 | 10/2008 | Gardner |
| 7,861,719 B1 | 1/2011 | Grove et al. |
| 2005/0034651 A1 | 2/2005 | Albiston et al. |
| 2005/0223902 A1 | 10/2005 | Lovell |

FOREIGN PATENT DOCUMENTS

| CA | 1 265 754 A1 | 2/1990 |
| GB | 1 429 476 A | 3/1976 |

Primary Examiner — Christopher P Jones
(74) Attorney, Agent, or Firm — Wyatt B. Pratt

(57) ABSTRACT

A conformal filter is disclosed having a plurality of sorbent beds oriented perpendicular to an inner side surface of the filter which conforms to an adjacent surface, such as a wearer's face when attached to a respirator. The inner side of the filter may approximate the curved shape of an interfacing surface. Because the sorbent beds are oriented perpendicular to the inner side surface, a conformal configuration can be achieved without bending the sorbent beds and while keeping constant bed residence time throughout the entire cross-sectional area of the air flow, thus enforcing even air distribution. Reduced bed depth is also achieved through this configuration which consequently reduces the overall pressure drop through the filter. Other embodiments are described and claimed.

20 Claims, 13 Drawing Sheets

CONFORMAL SPLIT PLANAR FLOW AIR PURIFYING FILTER

CROSS-REFERENCE TO RELATED APPLICATIONS

This application is a continuation of International Patent Application No. PCT/US2012/021937 filed Jan. 20, 2012, which claims the benefit of U.S. Provisional Patent Application No. 61/434,749 filed Jan. 20, 2011, the contents of both of which are incorporated herein by reference.

FIELD OF THE DISCLOSURE

The present disclosure relates generally to respiratory filters, specifically their design and assembly to provide air purification of contaminated environments required to protect users. Particularly this disclosure relates to a conformal air-purifying filter for use in air purification systems.

BACKGROUND OF THE DISCLOSURE

Air purifying filters are designed to filter out harmful gases (gas filter) or a combination of harmful gases and particulates (combination filter). Gas and vapor purification is provided by sorbent which both physically adsorbs and chemi-sorbs the contaminants preferentially from the air. The filter housing or canister must be designed such that contaminated air may not bypass the sorbent. Typically this is effected by the design and assembly of a sorbent bed. Typical sorbent beds are of uniform thickness with entrance and exit consisting of a flat uniform plane. The uniform plane is typically orientated such that it is normal to the direction of airflow. Sorbent beds that are uniform planes are typically less expensive and easier to manufacture in automated assembly than beds with a curved or conformal shape. Filters containing uniform flat beds do not conform to the wearer's face and body. The non-conformal shape detracts from the wearer's field of view, facepiece fit, and comfort, and leads to designs which are deemed less aesthetically pleasing. Aesthetic designs are important to wearers who must interact with the public without instilling fear (e.g. first responders and healthcare workers). Aesthetically pleasing designs also lead to better worker compliance. Filling of sorbent beds using traditional techniques such as snowstorm filling for conformal non-planar beds usually leads to reduced service life, or immediate breakthrough of contaminants.

It would be desirable to provide a filter that more closely conforms to a user, thus providing a less obtrusive and more comfortable device. Techniques for the assembly of conformal sorbent beds exist. These assembly techniques, however, are non-optimal, are prone to damaging the sorbent during filling, and are limited to near symmetrical conformal shapes with a limited degree of curvature. Materials solutions exist which depend on the use of flexible sorbent media. Such media, however, typically underperforms granular media. Conformal filters of these types either introduce higher inhalation resistance or cannot offer high levels of protection and service life.

SUMMARY OF THE DISCLOSURE

A design and assembly method is disclosed for conformal filters that: allows a conformal shape that minimizes the visible profile of the filter from the respirator, minimizes the distance of the center of mass to the respirator attachment point, provides freedom to adapt radius of curvature to various geometries as required to meet the aforementioned criteria, and has the ability to provide an asymmetric curvature and overall shape. Conformal filters of this type enable an improved field of view for facepiece-attached canisters, provide a reduced profile for body mounted filters, provide a reduced filter moment arm, provide lower inhalation resistance, enable organic filter shapes, and provide equivalent service life performance as compared to traditional flat uniform plane sorbent bed based filters.

A conformal air purifying filter is disclosed for use in air purifying respirator applications. A filter design is disclosed, which may be referred to as a "split planar flow" conformal filter. With this design, single or multiple planar sorbent beds, oriented perpendicular to the interfacing surface, are housed in a single filter. The bed residence time is uniformly fixed for all of the sorbent planes. The shape of these sorbent planes is not limited, thus providing flexibility that enables the design of a filter shape that is conformal to the interfacing surface. A variety of advantages may be obtained by utilizing a conformally shaped filter. For example, the user's field-of-view can be greatly increased, and the device may be more comfortable to wear. In addition, improved filter mounting strength can be achieved, as well as lower breathing resistance.

A conformal filter design and assembly method is disclosed. The filter design may be comprised of filter lid, body, retention media, sorbent, particulate media, sealing adhesives, and sorbent bed. The sorbent bed inlet and outlet are normal to the respirator mounting surface. The inlet plenum directs air from the contaminated area to the sorbent bed inlet. The outlet plenum directs air from the sorbent bed outlet to the respirator. The inlet and outlet of the sorbent bed are planar and the bed is of uniform thickness. The walls of the bed are allowed to conform to the shape of the respirator mount. The walls of the bed do not have to have the same degree of curvature, nor must they have a symmetric curvature. To minimize the visible profile and canister moment arm, the use of multiple planar sorbent beds is allowed: one bed, an even number of beds or an odd number of beds can all be effected with the disclosed design. Airflow through the sorbent beds is balanced so that the residence time of each bed is constant. Residence time is the ratio of sorbent volume to airflow. Airflow is balanced by adjusting inhalation resistance through the plenum. This can be effected by having different ratios of cross section area to bed length or resistive screen patterns and plenum inlet/outlet orifices and shapes. The sorbent bed wall and overall canister can curve in one or two axes of curvature.

A filter is disclosed, including an entry port and an exit port, the entry port for introducing air into a filter cartridge, the exit port for directing filtered air from the filter cartridge into a respirator or other purified airspace. The filter may include a sorbent bed having a constant depth of sorbent, a flat inlet surface adjacent to an entry space for airflow entry into the sorbent bed, and an exit space for airflow exit out of the sorbent bed. The entry space may be in fluid communication with the entry port, while the exit space may be in fluid communication with the exit port. The filter may have an inner surface positionable adjacent to an interfacing surface, where the sorbent bed has a bed plane oriented perpendicular to the inner surface.

BRIEF DESCRIPTION OF THE DRAWINGS

By way of example, a specific embodiment of the disclosed device will now be described, with reference to the accompanying drawings.

DETAILED DESCRIPTION

The disclosure relates to conformal air purifying filters, and cartridges containing these filters, having planar conformal configurations. In some embodiments these filters include multiple planar sorbent beds housed in a single filter, which may be oriented perpendicular to the wearer's face. Airflow through the conformal filters transits parallel to the side of the wearer's face and through the sorbent beds. Such conformal filters, when mounted onto a mask, are streamlined to the wearer's face, giving the user more comfort, providing the user with a greater field of view, securing the cartridge in place and reducing the risk of improper mounting of the cartridge.

Figure 1:
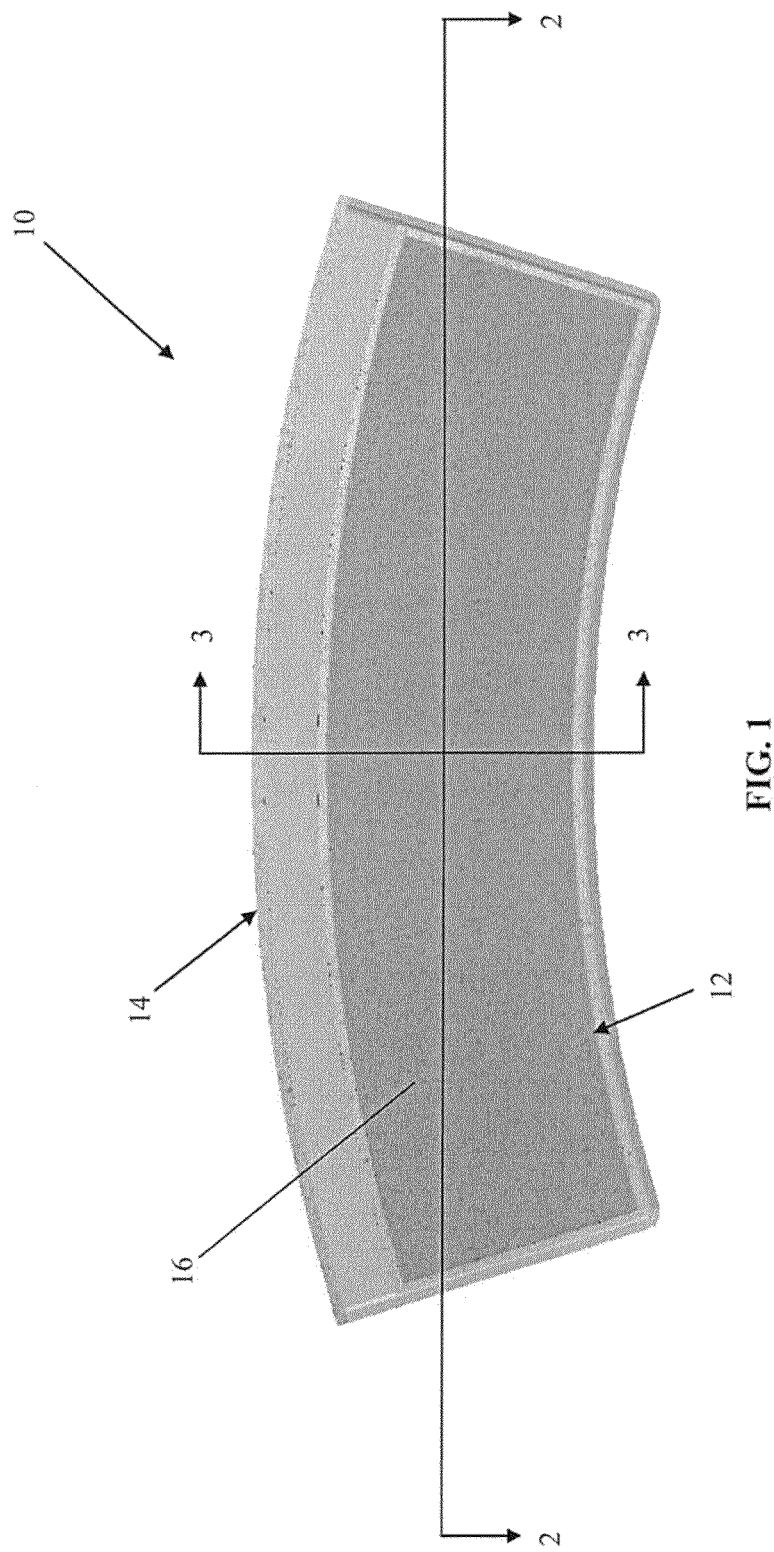
FIG. 1 is a side view of the disclosed conformal filter.
Figure 2:
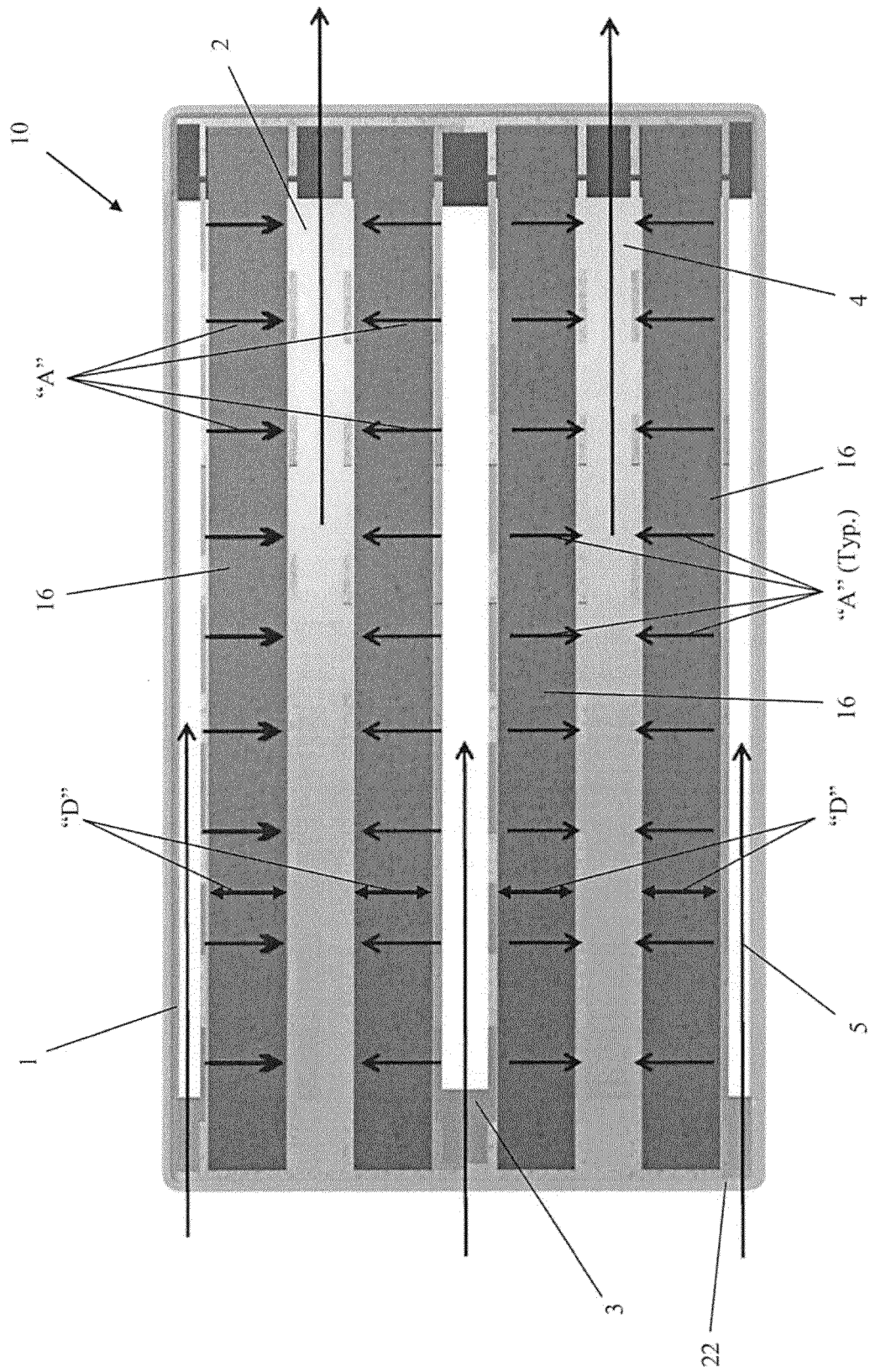
FIG. 2 is a cross-section view of the conformal filter of FIG. 1 taken along line 2-2.
Figure 3:
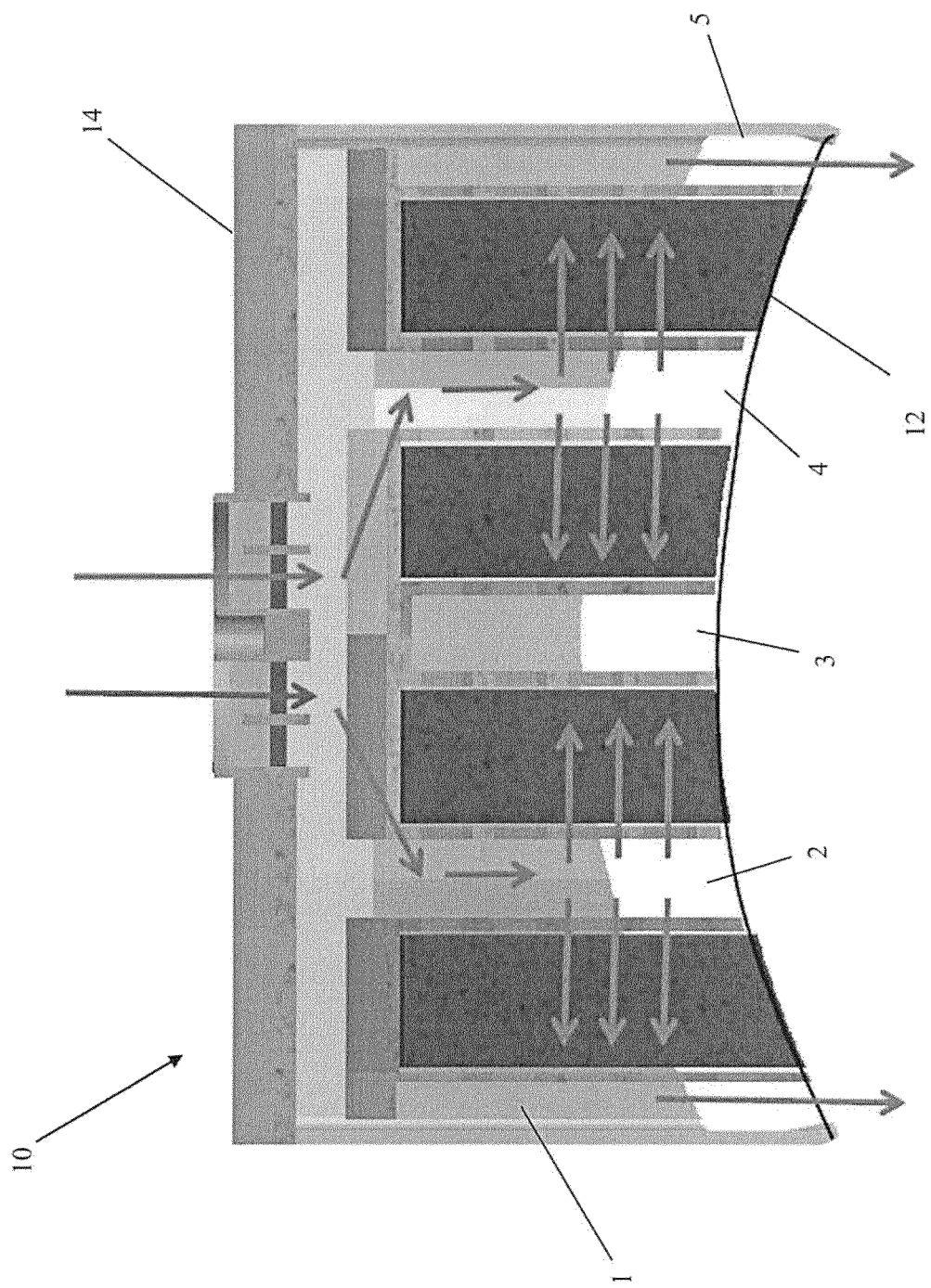
FIG. 3 is a cross-section view of the conformal filter of the FIG. 1 taken along line 3-3.

Referring to FIGS. 1-3, an embodiment of the disclosed planar conformal filter cartridge 10 includes multiple planar sorbent beds 16 housed within a single filter cartridge. The planar sorbent beds 16 may be oriented such that the bed planes are perpendicular to a non-planar surface, which in one non-limiting exemplary embodiment may be the surface of a wearer's face. As seen in FIG. 1, the filter cartridge 10 includes a curved inner surface 12 that can be positioned adjacent the wearer's face, and an outer surface 14 positioned away from the wearer's face. A single sorbent bed 16 can be seen within the cartridge 10. The cartridge 10 may in some embodiments include a mounting lock or other mounting feature (not shown) for securing the cartridge to an interfacing surface, such as the face piece of a user's mask (not shown), and a connecting port for directing filtered air into the user's mask. In one embodiment, a mounting lock, sometimes referred to as an end-lock, works together with a filter connection port to secure the filter cartridge to a mask.

Referring to FIG. 2, the filter cartridge 10 is shown with four individual sorbent beds 16. It will be appreciated, however, that this number is not limiting, and that greater or fewer sorbent beds can be provided, as desired. In one embodiment, the bed depth "D" of the sorbent beds 16 is uniformly fixed for all sorbent planes. As can be seen, the four sorbent planes shown in FIG. 2 divide the filter space into a plurality of separate spaces 1, 2, 3, 4, 5.

Because the sorbent beds 16 are oriented perpendicular to the inner surface 12 (which will be adjacent to the wearer's face), the shape of the filter cartridge 10 along the inner surface 12 may be conformal to a wearer's features without affecting the air flow pattern through the cartridge. This is because the conformal shape can be achieved without bending the sorbent beds 16. Although the illustrated embodiment shows the inner surface 12 as a simple curved shape, it will be appreciated that any of a variety of conformal shapes (including three-dimensional conformal configurations) can be provided without affecting the operation and efficiency of the resulting filter cartridge 10.

As noted, the plurality of sorbent beds 16 divide the interior volume of the filter cartridge 10 into a plurality of separate air spaces. As shown in FIG. 2, the filter cartridge 10 includes five separate air spaces 1, 2, 3, 4, 5 formed between adjacent sorbent beds 16. In use, outside air may enter the filter cartridge 10 through an entry port 22, where it is directed into the odd-numbered spaces 1, 3, 5. In the illustrated embodiment, the odd-numbered spaces 1, 3, 5 have openings in fluid communication with the entry port 22, while even-numbered spaces 2 and 4 do not. The even-numbered spaces 2, 4 have openings in fluid communication with a connecting port, while the odd-numbered spaces 1, 3, 5 do not. This arrangement forces inlet air to flow through the sorbent beds 16 where the air is filtered by the sorbent media. Thus, air flows through the odd-numbers spaces 1, 3, 5, through the associated sorbent beds 16 (generally in the direction indicated by arrows "A"), and then into the even numbered spaces 2, 4. (It will be appreciated that the air flow through the sorbent beds 16 will not be exactly perpendicular to the channels, as indicated by the arrows "A." Rather, the arrows are simply an indicated of the general direction of air flow through the filter cartridge 10.) Finally the air may pass from the even numbered spaces 2, 4 out through a connecting port and into an associated breathing mask (not shown). It will be appreciated that the illustrated configuration of sorbent beds 16 and spaces 1-5 is merely exemplary, and a wide variety of space/bed configurations and combinations may be used without departing from the spirit of the disclosure.

Figure 13B:
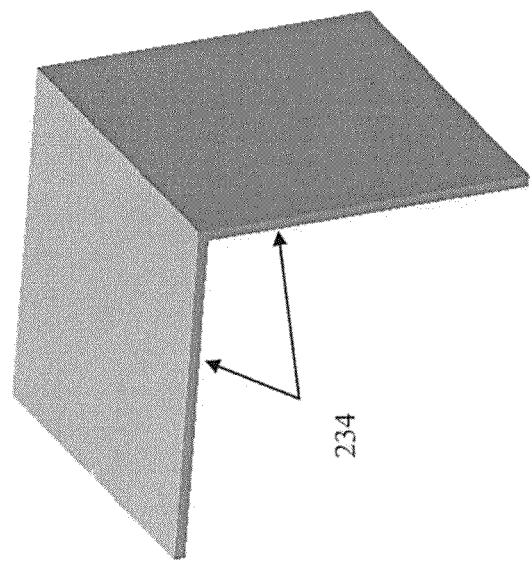
FIGS. 13A and 13B are examples of conformal surface shapes that can be implemented with the disclosed filter.
Figure 13A:
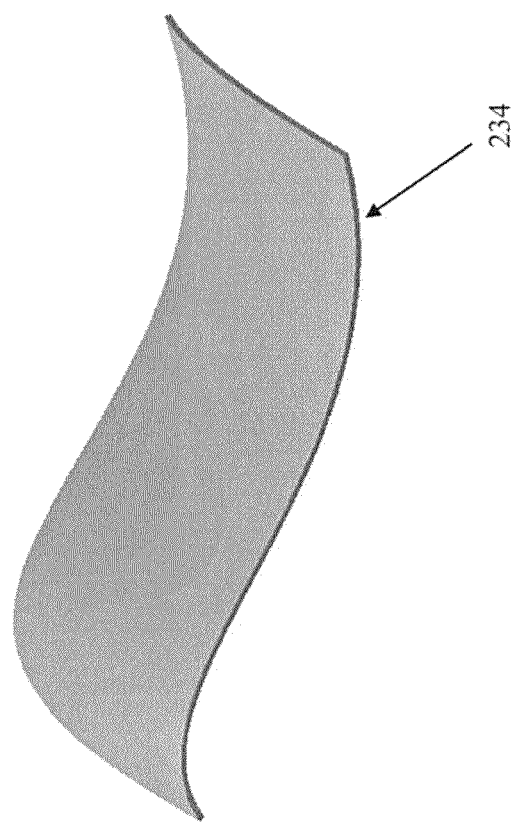

Referring again to FIG. 1, it can be seen that the sorbent planes 16 need not be rectangular (or even geometric), and can thus be shaped to produce a cartridge 10 with a conformal configuration approximating any of a variety of desired shapes (see, e.g., FIGS. 13A, 13B). Thus, the sorbent planes 16 can be produced to interface with a variety of surfaces, not just a wearer's face. For example, the sorbent planes 16 can be configured to conform to a wearer's back, to the body of an animal (e.g., a dog), or to uniquely shaped space within a vehicle.

In some embodiments, the overall volume and area of the filter cartridge 10 can be extended by adding additional sorbent planes that extend beyond an interfacing surface (e.g., a mask worn by a user). For example, such an arrangement could result in sorbent planes covering a large area of the wearer's cheeks.

Referring now to FIG. 3, a plurality of uniformly shaped filter sorbent beds 16 are shown within the conformal filter cartridge 10. The illustrated filter cartridge 10 has a curved outer surface 14 and a curved inner surface 12 for conformal placement next to a wearer's cheek. As previously described, the sorbent beds 16 are arranged such that outside air enters the cartridge 10 through entry port 22 (see FIG. 2) and into the odd-numbered spaces 1, 3, 5. As the air passes through these spaces 1, 3, 5, it flows through the adjacent sorbent beds 16 and into the even-numbered spaces 2, 4. Air exits the even-numbered plenums 2, 4 and into a breathing mask (not shown). As can be seen, the multiple sorbent bed 16 planes in the filter 10 are oriented perpendicular to the inner surface 12 of the filter cartridge 10, thus providing a surface that is conformal with a wearer's face. Additional air flow passages and/or sorbent beds 16 may be added as desired.

Figure 4:
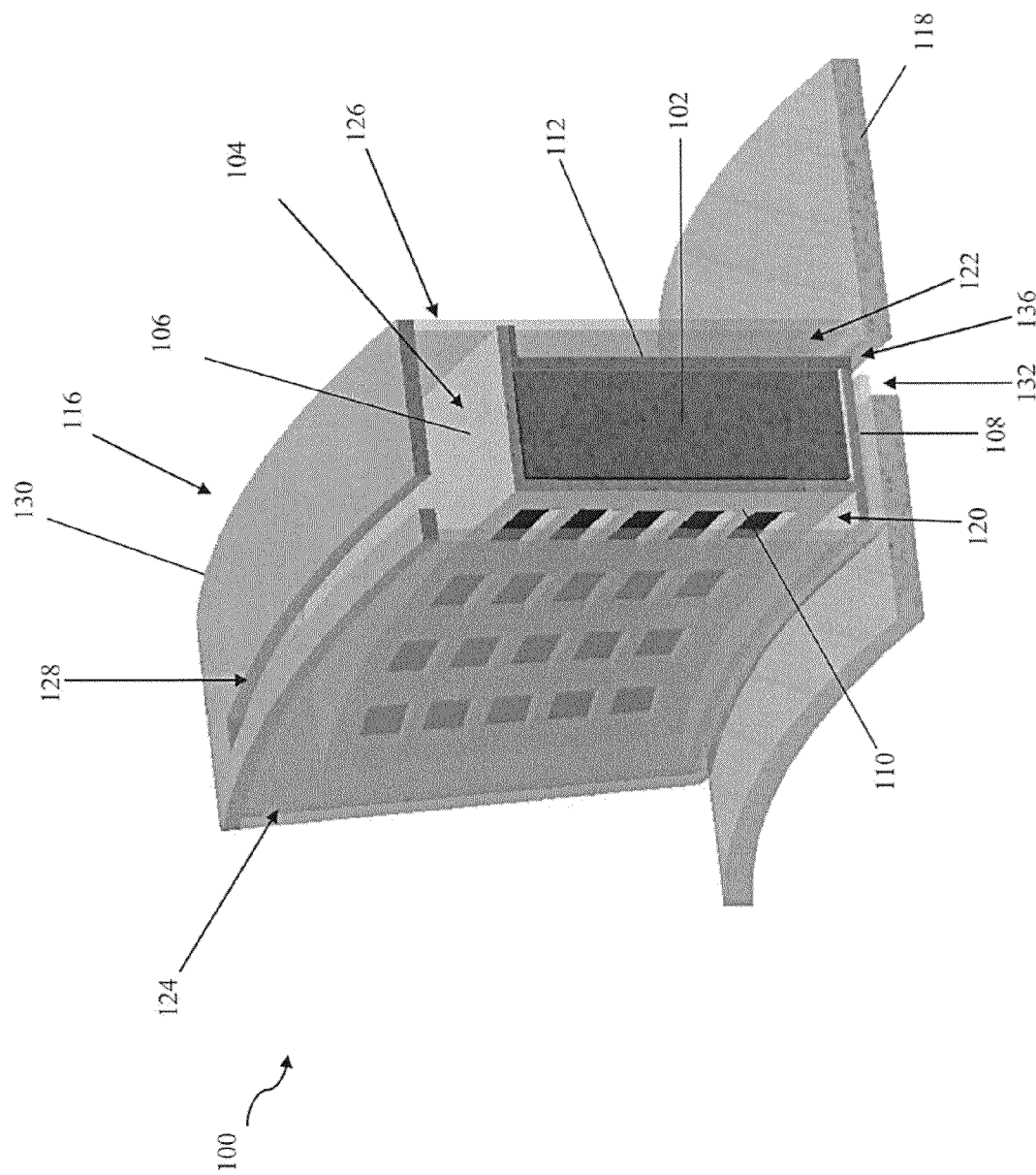
FIG. 4 is a partial cutaway transparent view of an embodiment of the disclosed filter.
Figure 5:
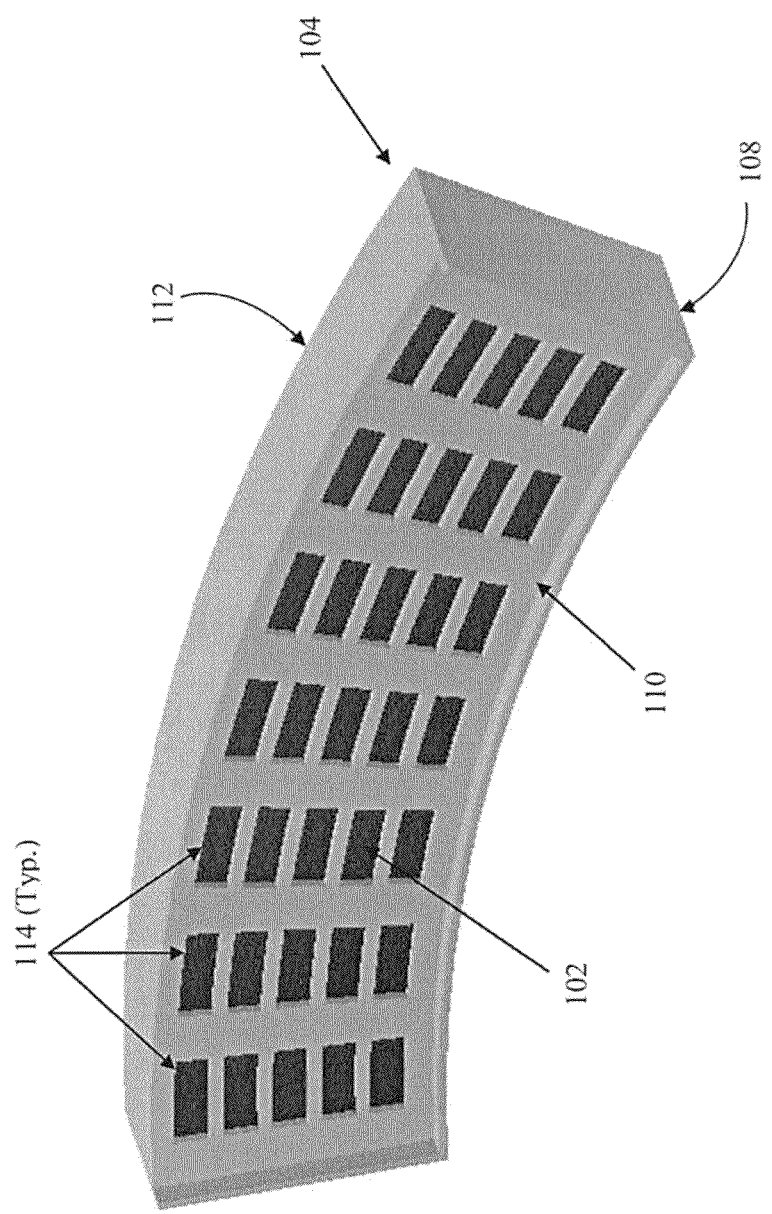
FIG. 5 is an isometric view of a sorbent bed plenum for use with the filter of FIG. 4.

Referring now to FIGS. 4 and 5, an embodiment of a filter 100 is shown in which a sorbent bed 102 is disposed in a sorbent bed plenum 104 having a top surface 106, a bottom surface 108 and first and second side surfaces 110, 112. The first and second side surfaces 110, 112 include a plurality of openings 114 through which air can flow to interact with the sorbent bed 102 contained therein. The sorbent bed 102 and sorbent bed plenum 104 are housed in a cartridge element 116 that itself includes, or is coupled to, an interfacing surface 118 which can be a portion of a face mask or other attachment surface.

The sorbent bed plenum 104 may be positioned within the cartridge element 116 so that entry and exit air spaces 120, 122 are formed between the first and second side surfaces 110, 112 of the bed enclosure and associated side surfaces 124, 126 of the cartridge element. The cartridge element 116 includes an air entry port 128 in a top surface 130 thereof, and an air exit port 132 in a bottom surface 134 thereof. The air entry port 128 is in fluid communication with the entry air space 120, and the air exit port 132 is in fluid communication with a port 136 in the interfacing surface 118. Thus arranged, air enters through the air entry port 128, flows into the air entry space 120, passes through the openings 114 into the sorbent bed 102, out into the air exit space 122, and then exits through the air exit port 132 and the interfacing surface port 136. Filtered air from the interfacing surface port 136 is then passed to the user via an associated breathing mask (not shown).

As can be seen, the top and bottom surfaces 106, 108 of the sorbent bed plenum 104, as well as the top and bottom surfaces 130, 134 of the cartridge element 116 are curved in a conformal manner. The interfacing surface 118 is also curved to match the shape of the cartridge element and bed enclosure. It will be appreciated that although these surfaces are shown as being gently curved, they could instead be any of a variety of configurations.

The filter described in relation to FIGS. 4 and 5 includes a single sorbent bed plenum 104. As previously noted, however, filters according to the disclosure can include a plurality of such plenums. FIGS. 6 through 12 illustrate such embodiments in which a plurality of sorbent bed plenums are provided within a single cartridge element.

Figure 6:
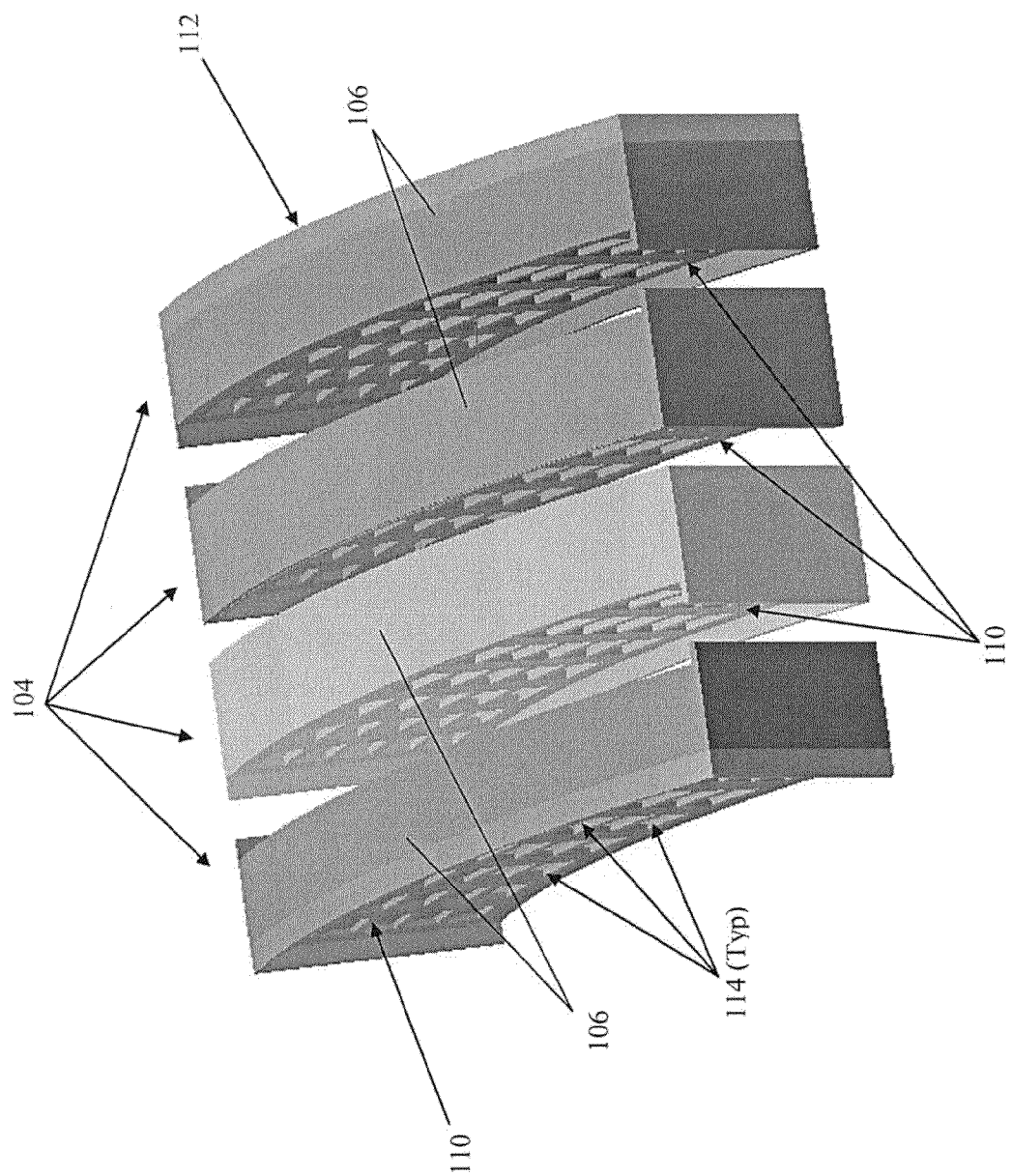
FIG. 6 is an isometric view of a plurality of sorbent bed plenums of FIG. 5 placed in spaced apart relation.

FIG. 6 shows an exemplary spatial relationship between a plurality of adjacently disposed sorbent bed plenums 104 for filter embodiments employing a plurality of such plenums. As can be seen, each sorbent bed plenum 104 main contain an associated sorbent bed 102. The sorbent beds 102 and sorbent bed plenums 104 may include some or all of the features described in relation to the beds and plenums of FIGS. 4 and 5 including conformal top end bottom surfaces 106, 108, first and second side surfaces 110, 112 and a plurality of openings 114 in the first and second side surfaces.

Figure 7:
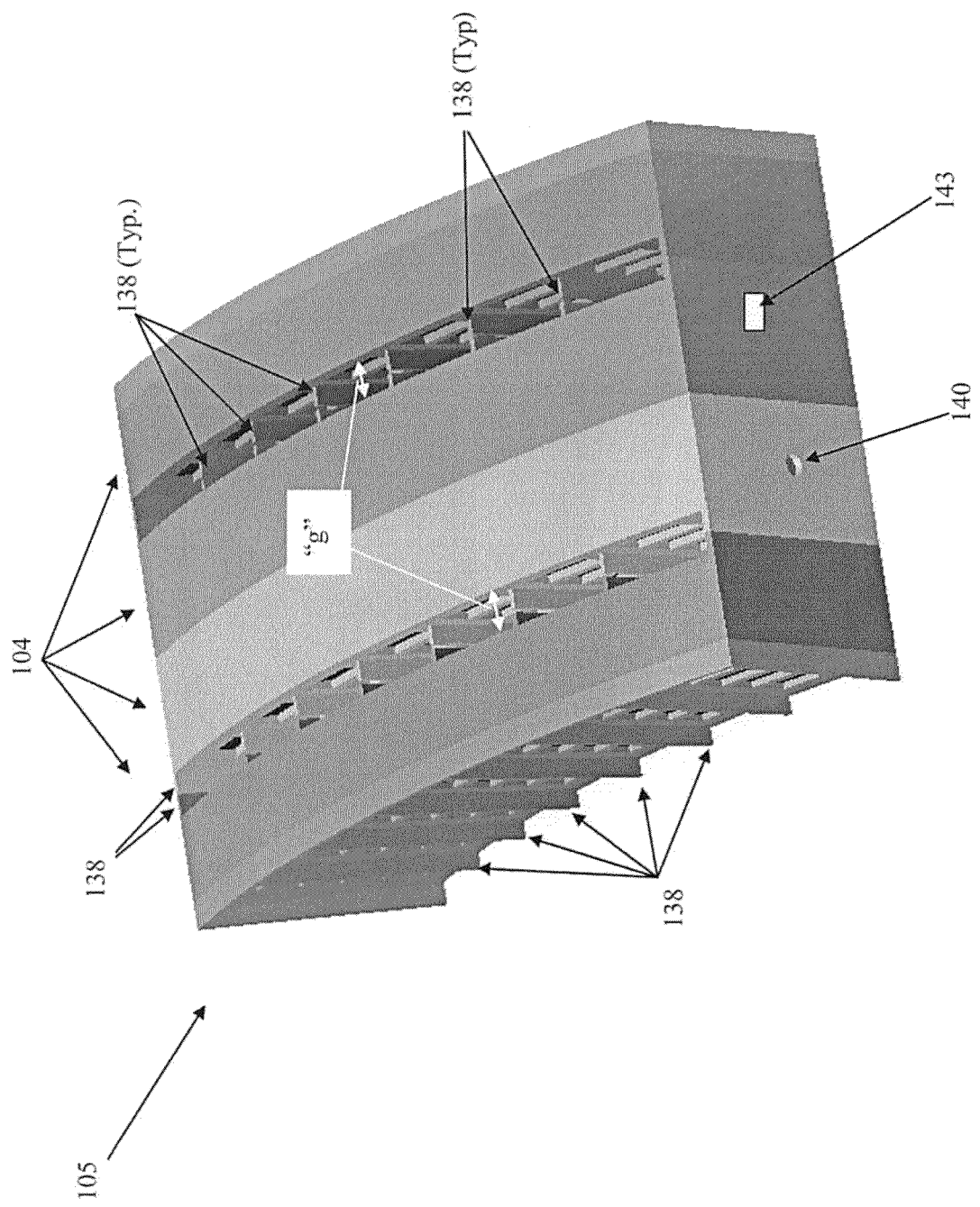
FIG. 7 is an isometric view of the plurality of sorbent bed plenums of FIG. 6 in an assembled configuration.

As will be appreciated, the FIG. 6 view is an "unassembled" view, in which each of the sorbent bed plenums 104 has been fabricated as an individual piece. This arrangement facilitates selection and replacement of individual plenums 104. The individually fabricated plenums 104 can be assembled into a larger multi-bed unit 105 shown in FIG. 7. As can be seen in FIG. 7, one or more of the sorbent bed plenums 104 may include a plurality of laterally oriented fins or protrusions 138 that serve to provide a predetermined gap "g" between the first and second side surfaces 110, 112 of adjacent plenums. This gap "g" ensures that an air space having a predetermined width equal to the gap "g" is formed between adjacent bed enclosures 104 during assembly. The protrusions 138 also provide structural stability for the filter 100 to ensure that the plenum offsets are maintained even when the filter experiences external forces (bumps, etc.) during use.

Using these projections 138 to provide a desired offset between adjacent bed enclosures 104 enables careful control of the air spaces between adjacent plenums so that any variation of air flow velocity across the plenums remains below a value that could result in significant impact on filter performance.

FIG. 7 further illustrates a feature in which wherein at least one of the plenums 104 has an opening 140 disposed in an end wall 142 thereof. This opening 140 may serve as a detection port to facilitate interaction with a residual life indicator sensor or an end of service life indicator so that filter replacement can be planned for in an efficient manner. In addition, an electronic or mechanical identification element 143 may be mounted on one side of at least one of the plenums 104 to serve as a filter identification element. In one embodiment, the identification element 143 is a passive or active radio frequency identification (RFID) tag. In another embodiment, the identification element 143 is a stamp or other visual identifier.

Figure 8:
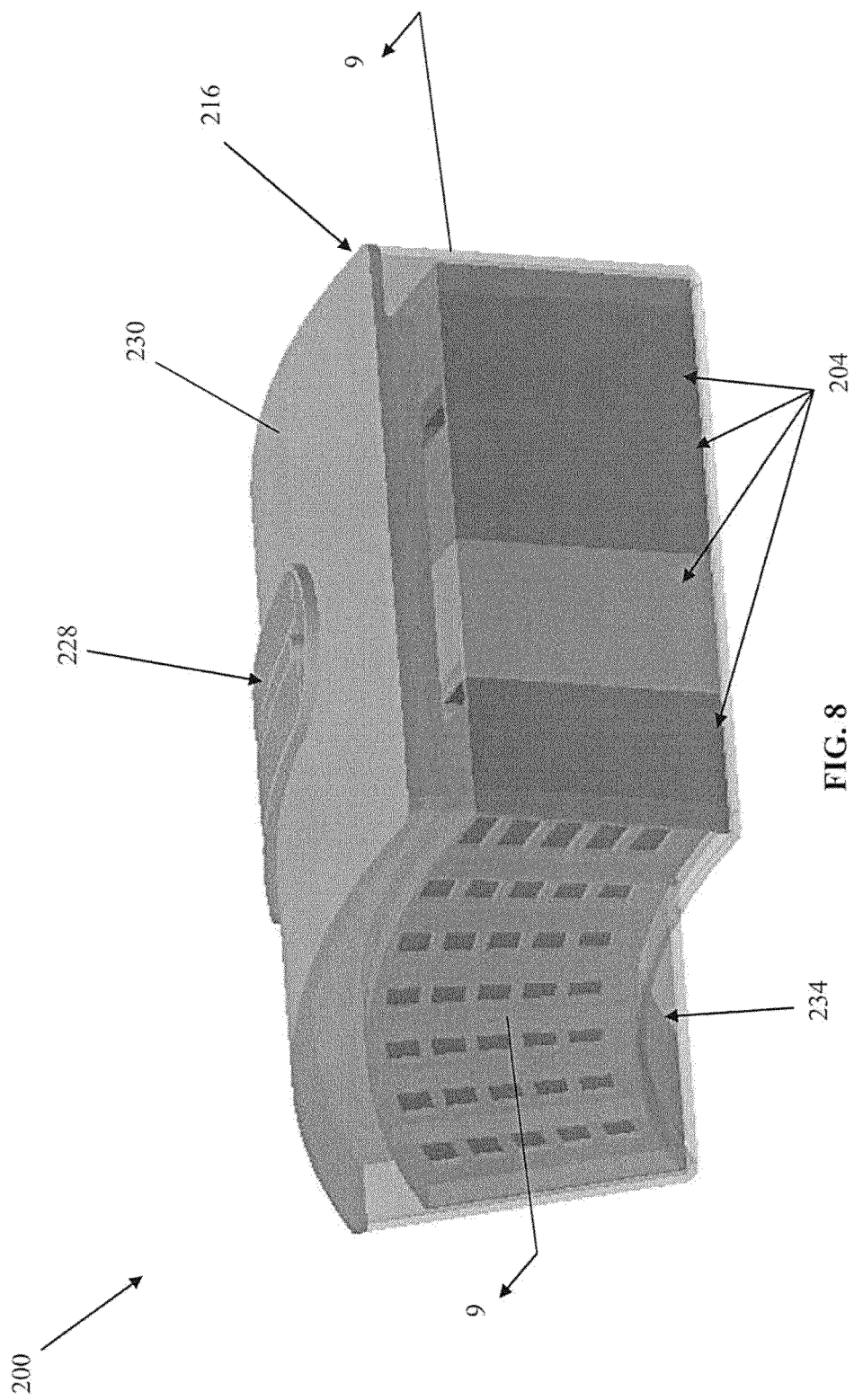
FIG. 8 is a transparent isometric view of another embodiment of the disclosed filter, including the plurality of sorbent bed plenums of FIG. 7.

FIG. 8 shows a filter 200 having a cartridge element 216 enclosing a plurality of sorbent bed plenums 204. Each of the sorbent bed plenums 204 may include some or all of the features of the sorbent bed plenums 104 described in relation to FIGS. 4-7. The illustrated embodiment includes four separate sorbent bed plenums 204, though it will be appreciated that fewer or greater numbers of plenums could be provided. The cartridge element 216 includes an air entry port 228 in a top surface 230 thereof, and at least one air exit port 232 (see FIG. 9) in a bottom surface 234 thereof. As will be appreciated, the bottom surface 234 may be curved to conform to a portion of the user's body (or other surface) that will carry the filter 200. It will be appreciated that the top and bottom surfaces 230, 234 may have the same curvature, or the curvatures may be different as desired.

Figure 9:
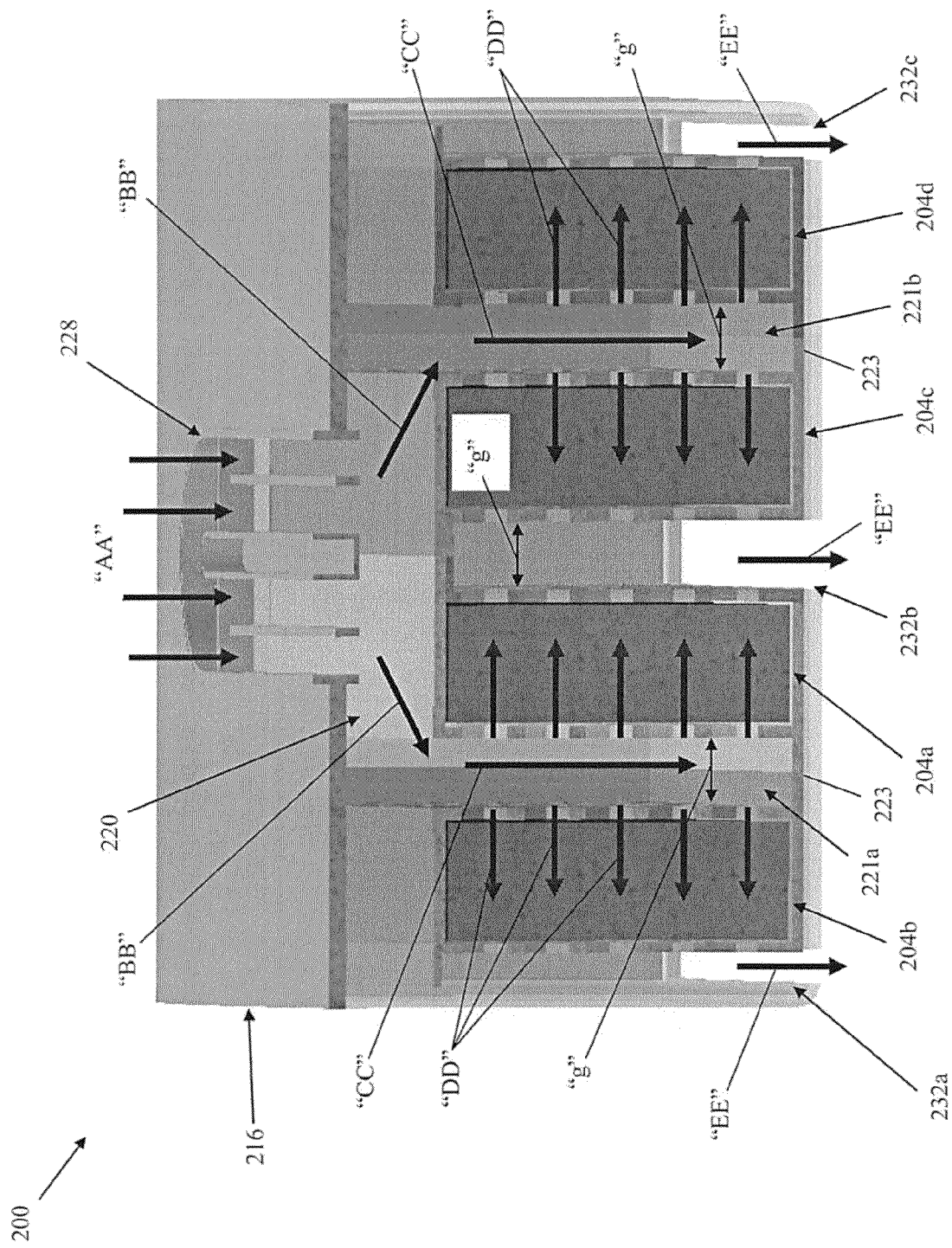
FIG. 9 is a cross-section view of the filter of FIG. 8 taken along line 9-9 of FIG. 8.

FIG. 9 illustrates the interior organization of the adjacent plurality of sorbent bed plenums 204 and the associated air flow path therethrough. As noted with respect to FIG. 8, the filter 200 includes four individual sorbent bed plenums which form a plurality of air spaces therebetween. Thus, air enters the air entry port 228 of the cartridge element 216 in the direction of arrows "AA" and flows into the air entry space 220. The air then flows through the air entry space in the direction of arrows "BB" and into the air spaces 221a, 221b between first and second, and third and fourth, sorbent bed plenums 204a, 204b, 204c, 204d (arrows "CC"). The air spaces 221a, 221b are bounded by respective end walls 223 of the cartridge element 216, which forces the air laterally through the sorbent bed plenums 204a, b, c, d in the direction of arrows "DD." The filtered air then flows out of the sorbent bed plenums into exit air spaces 222a, b, c along arrows "EE" and then out the associated exit ports 232a, b, c where it can be supplied to a user.

Figure 10:
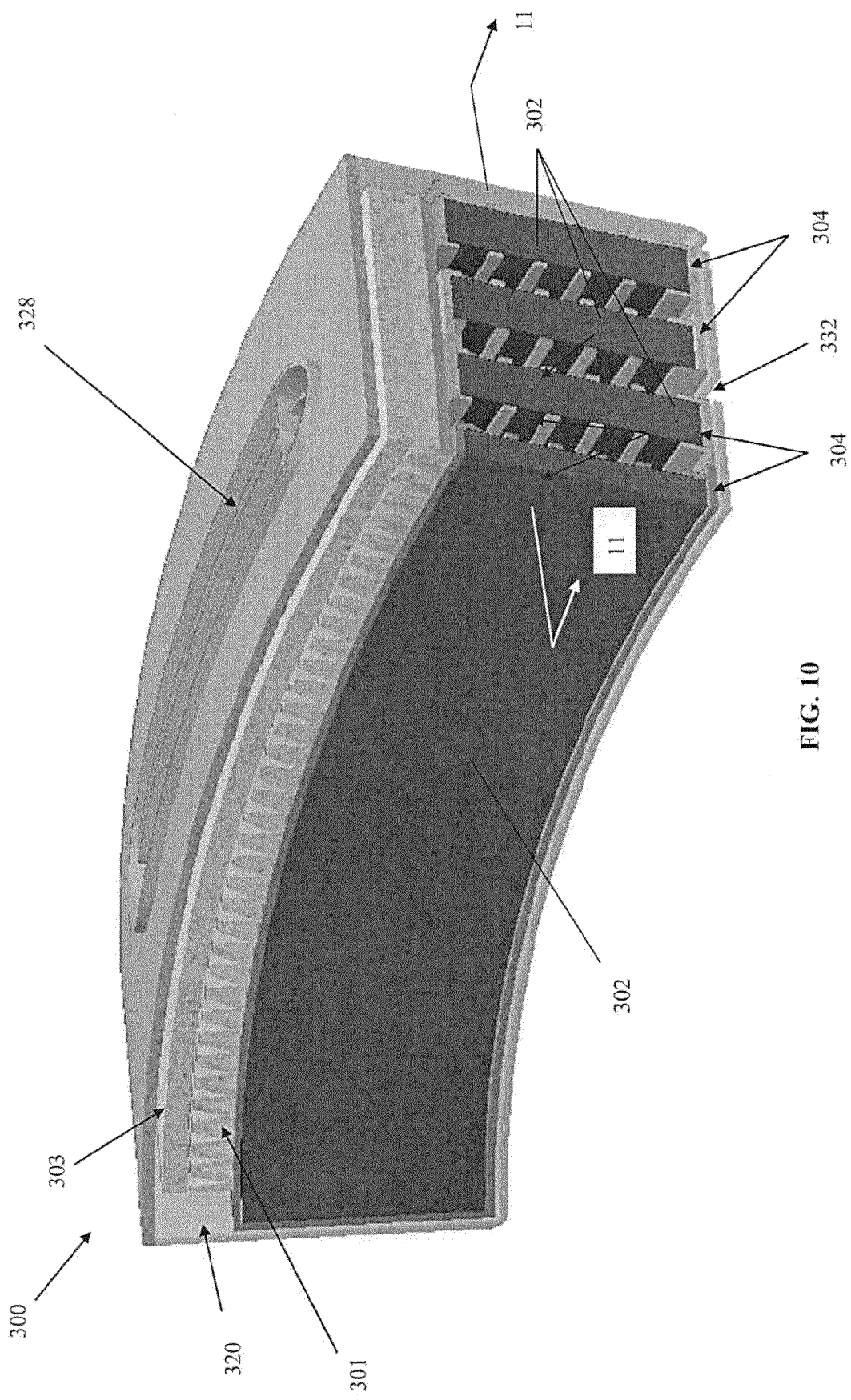
FIG. 10 is a partial cutaway transparent view of the filter of FIG. 8, incorporating a high efficiency particulate filter at the air inlet.
Figure 11:
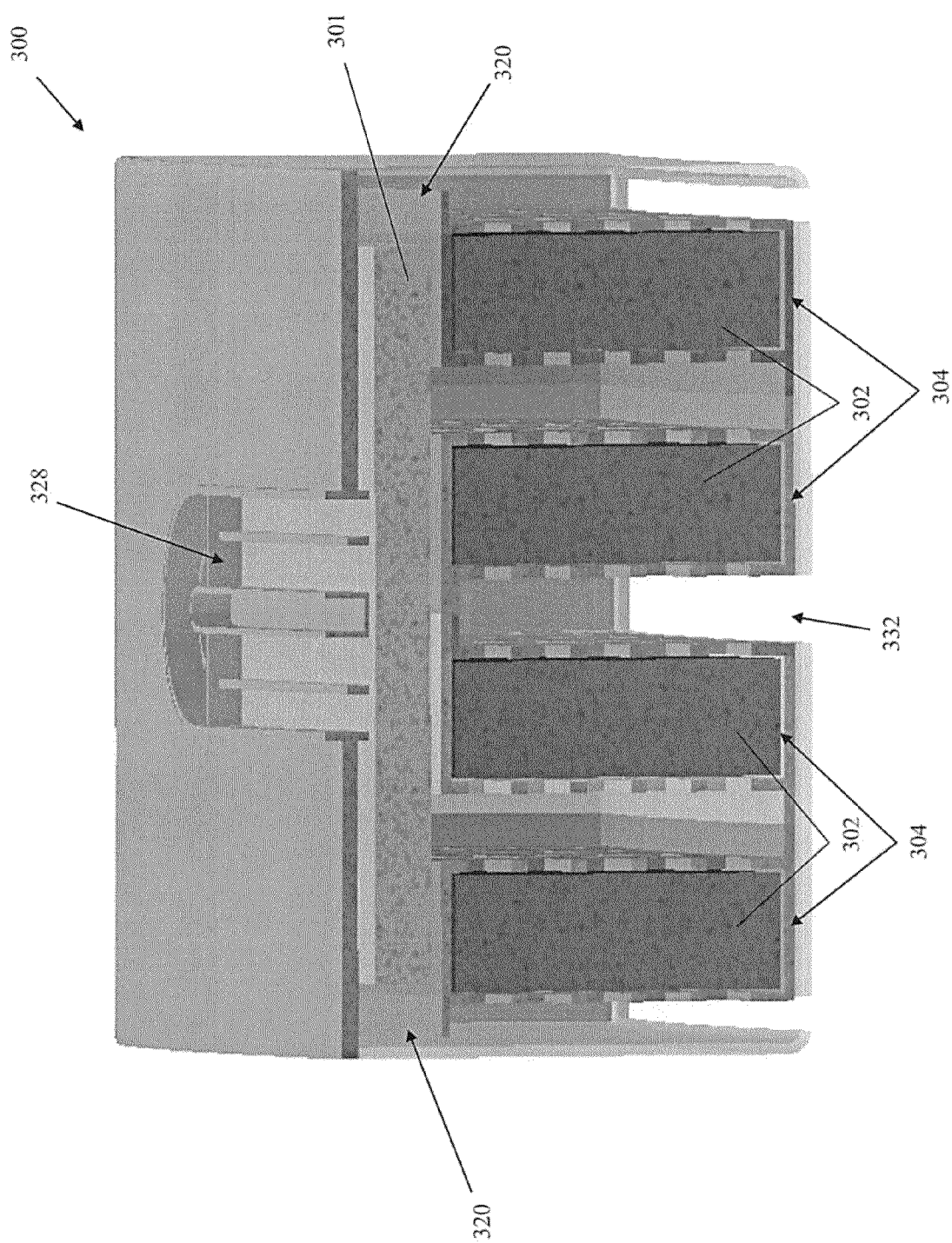
FIG. 11 is a cross-section view of the filter of FIG. 8 taken along line 10-10 of FIG. 10.

FIGS. 10 and 11 illustrate an embodiment of the disclosed filter 300 that includes a layer of filtration media 301 disposed in the entry air space 320 so that air entering the filter through the entry port 328 is pre-filtered prior to entering the sorbent bed plenums 304 and interacting with the sorbent beds 302.

Such pre-filtration may serve to remove entrained particulate contaminants from the inlet air so that such contaminants do not plug the sorbent beds 302 and reduce their service life. In the illustrated embodiment, the filtration media 301 comprises a pleated particulate filtration media. In one embodiment, the pleats of the pleated filtration media may be oriented perpendicular the planes of the sorbent beds 302 and sorbent bed plenums 304. It will be appreciated that this pleat orientation can prevent the formation of gaps between the filtration media 301 and the sorbent bed plenums 304, which could otherwise undesirably enable bypass flow paths to form around the filtration media. It will be appreciated that high efficiency particulate air (HEPA) filtration media other than the illustrated pleated filtration media may be used.

In addition, in lieu of, or in addition to, the particulate filtration media 301 a pre-filter or spark arrestor element 303 could be disposed in the entry air space 320 of the filter 300.

Figure 12:
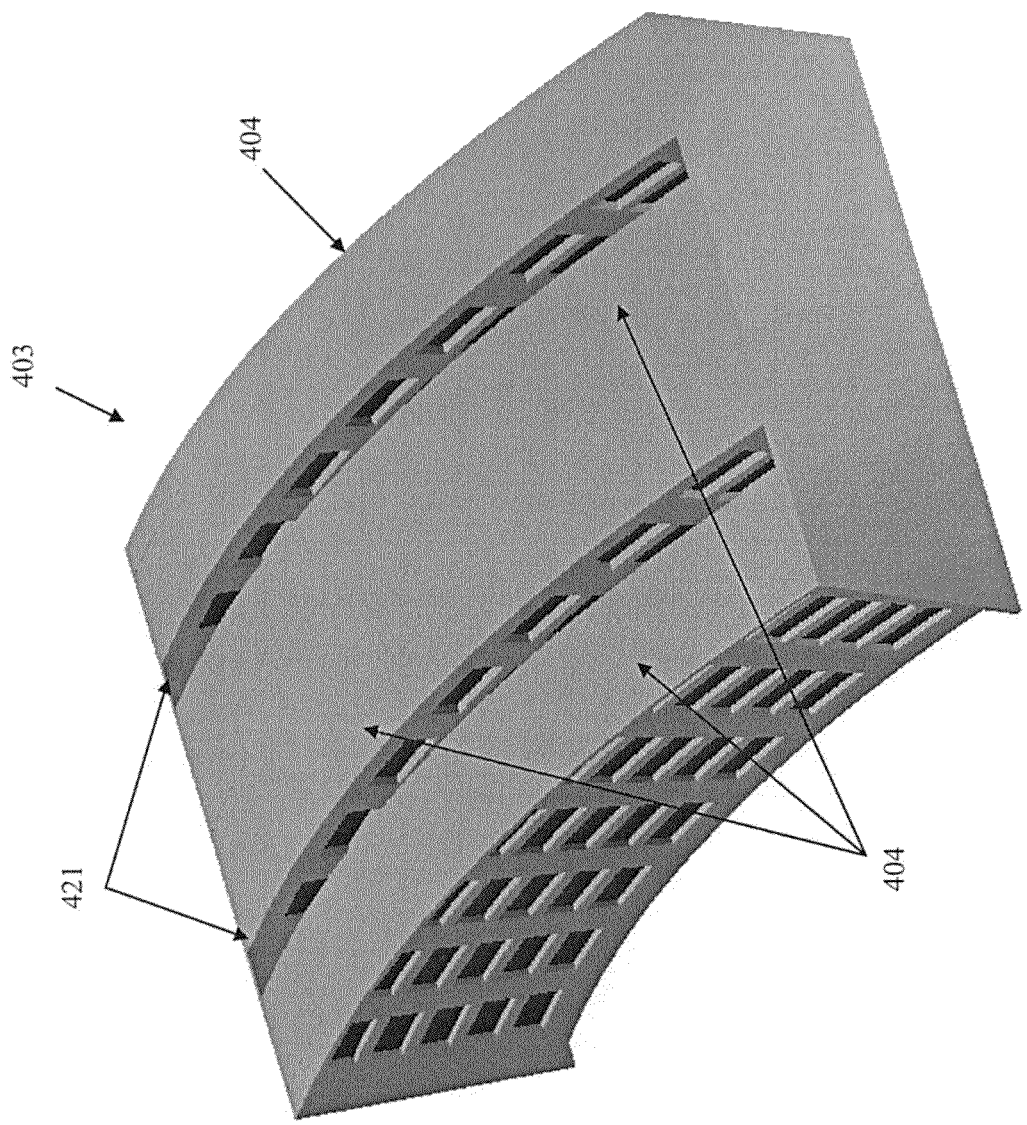
FIG. 12 is an embodiment of a plural sorbent bed plenum arrangement showing the sorbent bed plenums fabricated as a single piece.

FIG. 12 shows an embodiment of the disclosed design in which a plurality of sorbent bed plenums 404 are formed as a single assembly 403 that includes a plurality of sorbent beds 402 in a unitary enclosure. In this embodiment, air spaces 421 are integrally formed between adjacent sorbent bed plenums 404 during manufacture. In some embodiments, the sorbent bed plenum assembly 403 comprises a solid structure that is sealed about its periphery when the filter is mounted into a filter host, such as a breathing mask.

The disclosed conformal filter may be useful for protecting individuals in military, law enforcement, medical and/or civilian roles. Conformal filters also allow mask and/or cartridge designs for particular purposes. Filters having a conformal configuration can allow a multitude of filter designs, since the shape of the sorbent planes are not limited, and the air can always pass through a constant depth of sorbent bed material. FIGS. 13A and 13B show two non-limiting examples of conformal shapes that can be implemented in the disclosed filters. FIG. 13A shows a surface having a complex curvature embodied in a wave shape. FIG. 13B shows a multi-plane surface where two flat sections meet at a 90-degree angle. These shapes may be implemented as the bottom surface 12, 234 of a cartridge 10, 216 (see FIGS. 3 and 8), and the sorbent beds and sorbent bed plenums contained within such cartridges may be similarly shaped. Thus, the sorbent beds and sorbent bed plenums can be formed to achieve these and other complex shapes, as will be appreciated by those of skill in the art.

Variants based on the disclosed design include traditional planar variants, one and two axis conformal, gas only, combination gas and particulate, individual protection, collective protection, disposable all in one combinations with particulate filters and stackable cassette style replaceable gas and particulate components.

The invention includes a filter shape design that is conformal to any of a variety of shaped surfaces. This allows significant advantages over cylindrical flow pattern filters, such as an increased field of view, greater comfort, and increased filter mounting strength, increased visibility, improved ergonomics and lower breathing resistance. Where the filter is employed in a face mask, the inner surface of the filter cartridge may be placed closer to the human body (i.e., face) or to the mask than conventional filters, thus providing a sleeker appearance and greater comfort to the wearer. In addition, the outer surface of the filter cartridge can also be formed to be a smooth "conformal" surface which mirrors the conformal orientation of the inner side. Such an arrangement allows operational use of the filter cartridge without the outer side being readily bumped. Such an arrangement also provides an aesthetically pleasing exterior appearance, which is beneficial for reasons previously stated.

The disclosed design provides improved filter performance with reduced pressure drop, while employing cartridge shape and volume configurations that are not possible with conventional filters. As will be appreciated, numerous cartridge shapes may be formed with minimal manufacturing complications or quality concerns because the desired conformal shapes can be achieved without bending the sorbent beds 16.

The disclosed conformal filter also allows incorporation of the filter cartridge into a mask without extreme distortion of the outer appearance of the mask. In addition, overall volume of the filter cartridge can be increased without compromising performance.

The sorbent beds may be formed from a sorbent media that may include carbon materials comprising impregnated carbon and/or activated carbon. Other granular sorbent materials may also be suitable. Also, any materials that are air permeable and that are capable of absorbing or reacting with the gas contaminants to be removed or neutralized would also be suitable. The cartridge structure may be formed from suitable thermoplastic materials in injection molding processes or the like. Other materials having suitable properties for use as a filter cartridge may also be used, such as aluminum.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A filter, comprising:
an entry port and an exit port, the entry port for introducing air into a filter cartridge, the exit port for directing filtered air from the filter cartridge into at least one of a respirator and purified airspace;
a non-planar inner surface;
an interfacing surface adjacent to the non-planar inner surface;
a sorbent bed having a constant depth of sorbent, the sorbent bed having a flat inlet surface adjacent to an entry space for airflow entry into the sorbent bed, and a flat outlet surface adjacent to an exit space for airflow exit out of the sorbent bed, the entry space being in fluid communication with the entry port, the exit space being in fluid communication with the exit port, the sorbent bed having:
a plurality of walls extending perpendicularly to the inlet surface and the outlet surface; and
a bed plane perpendicular to the inner surface, at least one wall of the plurality of walls conforming to the non-planar inner surface.

2. The filter of claim 1, wherein the sorbent bed comprises a plurality of sorbent beds defining a plurality of spaces there between.

3. The filter of claim 1, wherein two walls of the plurality of walls on opposite sides of the sorbent bed are curved and have different degrees of curvature With respect to each other.

4. The filter of claim 1, wherein two walls of the plurality of walls on opposite sides of the sorbent bed are configured to be conformal to a human ergonomic shape.

5. The filter of claim 1, wherein the plurality of the walls of the sorbent bed have an asymmetric curvature.

6. The conformal filter of claim 1, wherein the sorbent bed comprises a plurality of sorbent beds having varying volumes determined by a shared ratio of sorbent bed volume to allowed airflow.

7. The filter of claim 1, wherein two walls of the plurality of walls on opposite sides of the sorbent bed are of different shapes and are assemblable to form a shape that is conformal to a human ergonomic body.

8. The filter of claim 1, wherein the sorbent bed comprises a plurality of sorbent beds, each of the plurality of sorbent beds comprising a sorbent bed plenum, the plurality of sorbent beds being assemblable to form a multi-plenum filter.

9. The filter of claim 8, further including a plurality of spacing fins configured to space apart and define a distance between adjacent sorbent bed plenums, the plurality of spacing fins providing mechanical support to adjacent sorbent bed plenums to resist external forces and to maintain a shape of the filter.

10. The filter of claim 9, wherein the distance between adjacent sorbent bed plenums is minimized so that a variation of air flow velocity across adjacent sorbent bed plenums is below a value that results significant impact to the filter performance.

11. The filter of claim 8, wherein at least one of the sorbent bed plenums has an opening at a wall of the sorbent bed plenum oriented perpendicular to the inlet and outlet surfaces which serves as a detection port for at least one of a residual life indicator and an end of service life indicator.

12. The filter of claim 1, wherein the sorbent bed is replaceable.

13. The filter of claim 1, wherein a particulate filtration media is disposed adjacent to the sorbent bed to filter particulate contaminants.

14. The filter of claim 13, wherein the particulate filtration media comprises a pleated particulate filtration media disposed in the entry space.

15. The filter of claim 14, wherein the direction of pleats of the particulate filtration media is oriented perpendicular to the inlet and outlet surfaces of the sorbent bed to facilitate an even distribution of air flow through the filter.

16. The filter of claim 1, wherein the sorbent bed comprises a plurality of sorbent beds, each of the plurality of sorbent beds comprising a sorbent bed plenum, the plurality of sorbent bed plenums formed as a single piece sorbent bed plenum assembly.

17. The filter of claim 16, wherein the sorbent bed plenum assembly is enclosed in a structure that is sealed at its periphery when the filter is mounted into a filter host.

18. The filter of claim 1, further comprising a spark arrest element mounted in the entry space.

19. The filter of claim 1, further comprising filter identification element mounted on the filter.

20. The filter of claim 19, wherein the filter identification element is at least one of an electronic and mechanical identification element.

* * * * *